United States Patent
Groitzsch et al.

(10) Patent No.: US 6,403,505 B1
(45) Date of Patent: Jun. 11, 2002

(54) COMPOSITE MATERIAL

(75) Inventors: Dieter Groitzsch, Hirschberg; Engelbert Löcher, Worms; Bernhard Klein, Birkenau, all of (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/251,605

(22) Filed: Feb. 17, 1999

(30) Foreign Application Priority Data

Feb. 17, 1998 (DE) .......................... 198 06 530

(51) Int. Cl.$^7$ .............................. B32B 27/12
(52) U.S. Cl. .................. 442/394; 442/398; 428/198
(58) Field of Search ................ 442/394, 398; 428/198

(56) References Cited

U.S. PATENT DOCUMENTS

| | | | | |
|---|---|---|---|---|
| 5,376,430 A | * | 12/1994 | Swenson et al. ........... 428/152 |
| 5,425,987 A | * | 6/1995 | Shawver et al. ............ 428/284 |
| 5,529,830 A | * | 6/1996 | Dutta et al. ................. 428/176 |
| 5,652,041 A | * | 7/1997 | Buerger et al. ............. 428/198 |
| 5,804,021 A | * | 9/1998 | Abuto et al. ................ 156/252 |
| 5,814,390 A | * | 9/1998 | Stokes et al. ............... 428/181 |
| 5,882,769 A | * | 3/1999 | McCormack et al. ....... 428/152 |
| 5,921,973 A | * | 7/1999 | Newkirk et al. ............ 604/365 |
| 6,001,460 A | * | 12/1999 | Morman et al. ............ 428/195 |
| 6,015,764 A | * | 1/2000 | McCormack et al. ....... 442/370 |
| 6,111,163 A | * | 8/2000 | McCormack et al. ....... 604/367 |
| 6,152,906 A | * | 11/2000 | Faulks et al. .......... 604/385.01 |

* cited by examiner

*Primary Examiner*—Terrel Morris
*Assistant Examiner*—Norca L. Torres
(74) *Attorney, Agent, or Firm*—Kenyon & Kenyon

(57) ABSTRACT

A composite material, including a laminate (1) made of a film (5) bonded to a nonwoven (7), wherein the nonwoven (7) and the film (5) are only bonded together at discrete points and the laminate (1) is stretched in at least one direction after being formed.

19 Claims, 4 Drawing Sheets

COMPOSITE MATERIAL

BACKGROUND INFORMATION

1. Field of the Invention

The present invention relates to a composite material including a laminate made of a polymer film bonded to a nonwoven.

2. Description of Related Art

Such a composite material is known. The film is applied in the liquid state to the nonwoven after it is manufactured, producing a continuous mutual bonding between the nonwoven and the polymeric material forming the film. The composite material obtained is in general relatively thick, water- and water vapor-impermeable, and relatively inflexible. It is predominantly used as artificial leather in manufacturing suitcases.

SUMMARY OF THE INVENTION

The object of the present invention is to develop a composite material of the aforementioned type that is relatively more flexible, more water vapor permeable, has a reduced elongation and a relatively increased strength.

This object is achieved according to the present invention by a composite material including a laminate (1) of a film (5) made of polymeric material bonded to a nonwoven (7), where the nonwoven and the film are bonded together at discrete points (3) and the laminate is stretched in at least one direction after it has been formed.

DETAILED DESCRIPTION OF THE INVENTION

Figure 1:
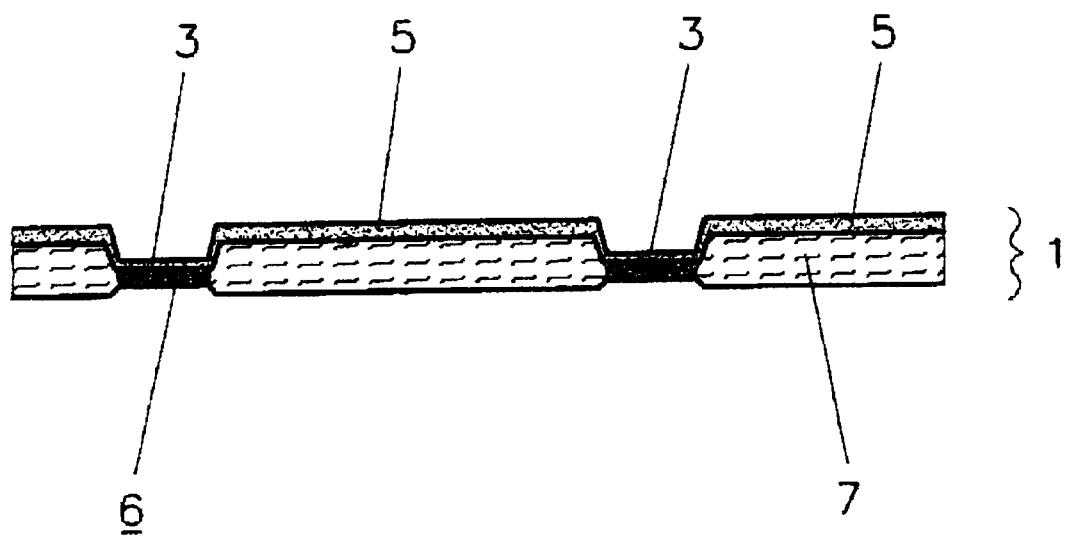
FIG. 1 shows as an example a cross section through an embodiment of the composite material of the invention.

In the composite material according to the present invention, the nonwoven and the film are produced independently of one another and are bonded together only in discrete zones, the laminate thus formed then being stretched in at least one direction. Thus the thickness of the laminate can be reduced to a considerable degree without risking uncontrollable tears in the film or the nonwoven. Flexibility and water vapor permeability are thus considerably improved. At the same time, increased orientation of both the fibers forming the nonwoven and the macromolecules forming the film is obtained in parallel to the direction of stretching, which increases the relative strength in this direction. In addition, the area expansion of the laminate is substantially increased, which improves the area yield and is advantageous from the cost point of view.

The composite material according to the present invention has considerably improved properties even if it is stretched in one direction only. Similar composite materials can be produced in a particularly simple manner, for example, using a stretching mechanism that includes at least two consecutive stretching roller pairs. In general, the use of stretching mechanisms having at least five consecutive stretching roller pairs, whose rotational speed is increased only slightly from one pair to the next is preferred. In this way, maximum stretching can be achieved while avoiding tears.

It has proven to be advantageous for most applications if the laminate is stretched both longitudinally and transversally. When such stretching is used, it is useful to use stretching values close to the maximum available for the entire available surface of the composite material.

For certain applications it has proven to be advantageous if the laminate has different properties in the longitudinal and transversal directions. Such a laminate can be obtained by stretching in the longitudinal and transversal directions with different intensities. Particularly advantageous products are stretched longitudinally at least 30% and at most 70% more than transversally.

The water vapor permeability of the film is considerably improved by stretching. For example, for personal hygiene applications, in particular for diaper linings, it has proven to be advantageous if the laminate is stretched to a water permeability value of 800 $g/m^2/24h$ as measured according to DIN 53122, Klima B.

The nonwoven and the film can, in general, also be bonded to one another using a secondary adhesive. Regular application and processing of an adhesive, however, is somewhat costly; therefore, for this invention an embodiment where the nonwoven and the film are bonded without the use of a secondary adhesive by only temporarily melting at least one of the existing layers in discrete bonding zones is preferred. This allows not only the quality of bonding between the nonwoven and the film to be controlled better than when a secondary adhesive is used, but also the chemical interaction of the ready-to-use material with secondary substances present during its intended use, in particular in personal hygiene applications, offers considerable advantages.

The bonding zones may be arranged along lines running essentially transversally to the direction of stretching. With such an arrangement, they provide both attachment between the nonwoven and the film and rigidity of the product in that direction. This latter effect is manifested especially when the bonding zones are configured in a straight line and arranged in parallel to imaginary straight lines, particularly as continuous lines.

Delamination of the two layers is avoided if they are bonded over their entire thickness in the bonding zones. This almost completely prevents constituents from being removed from the surface and contaminating the environment even in the case when the surface is subjected to friction.

The above-mentioned effect is obtained particularly effectively if the nonwoven in the laminate is made, at least in part, of continuous fibers. Nonwovens made, at least in part of staple fibers can, however, also be used.

The fibers in the nonwoven can be basically undrawn, which improves bondability and allows for better subsequent stretching. Then it may be advantageous to enhance fiber crystallinity by post-annealing. This technology is known to those skilled in the art.

The nonwoven in the laminate may be made, at least in part, of melt-blown microfibers, in particular in the area of the exposed surface. Microfibers have a diameter in the micrometer range. As a result, if the fiber density is sufficient, a surface structure having a mucosa-like softness is obtained. Such embodiments have proven particularly well-suited for health care and personal care products.

The laminate is entirely made of polymer material. It has proven to be particularly useful to make the film in the laminate of polypropylene or polyethylene. It may have a thickness of 15 to 60 micrometers in the finished product.

It has proven to be useful for the film to have uniformly distributed microparticles to favor the formation of micropores during stretching. Such microparticles may include chalk powder or the like mixed in in the proportion of up to 60 wt. %.

According to another variant, the film and the nonwoven are essentially parallel to one another in the ready-to-use composite. However, the manufacture of these materials assumes that the film and the nonwoven match one another with regard to their stretch ability and elasticity.

For many applications it has proven to be advantageous if the film and/or the nonwoven are curled. This curling of both materials may run in different directions. It imparts to the ready-to-use composite material a particularly soft, textile-like appearance and touch.

The composite material according to the present invention can be used to particular advantage for the manufacture of articles of personal hygiene, packing materials, and/or construction sheeting. Specific requirements exist in all these areas, which can be met with the composite material according to the present invention better than with the previously known materials.

The drawings illustrate a section of a composite material of the type according to the present invention. It includes a nonwoven 7, which is bonded to a film 2 at discrete points by temporarily melting the material that forms it and is subsequently stretched in two dimensions. The composite material has a relatively reduced thickness and elongation compared to the original material, but considerably higher relative strength.

Figure 2:
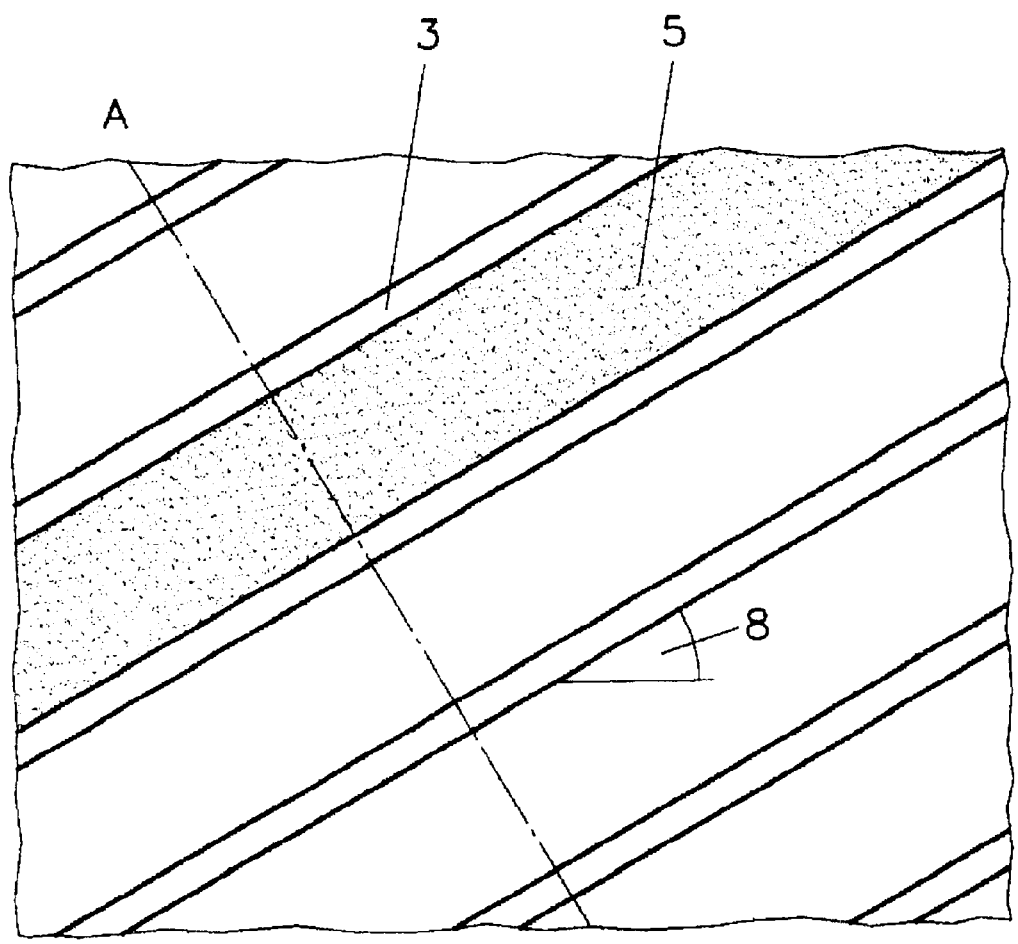
FIG. 2 shows a top view of the composite material of FIG. 1. The bonding zones are configured as straight lines parallel to one another.

The composite material whose longitudinal section is shown in FIG. 1 and a top view in FIG. 2 has a film 5 laminated onto a nonwoven 7.

Film 5 can be made of a thermoplastic material, preferably polyethylene or polypropylene. It is advantageously filled with chalk particles having a diameter in the micrometer range to form micropores. Film 5 can be manufactured independently of the nonwoven and subsequently placed on the latter, but it can also be directly extruded onto the nonwoven.

Nonwoven 7 may be made of staple or continuous fibers made of a thermoplastic material, preferably of a material related to that of the film. It can be compacted to some degree prior to being applied on the film, which facilitates handling, but it can also be compacted only after bonding with the film. Its gsm can be 30 to 150 $g/m^2$ for a thickness of 0.05 to 1.00 mm, measured according to European Standard 29073-02A.

As FIG. 1 shows, film 5 and nonwoven 7 can be bonded together in bonding zones 3 arranged along straight lines in parallel to one another. To bond the materials, the film is loosely placed on top of nonwoven 7, and the structure thus obtained is passed through the gap between two calender rollers in engagement with one another, one of which has metallic elevations protruding from its surface according to FIG. 1 to produce the bonding zones. The line pressure, temperature, and rotation speed of the rollers are adjusted so that after leaving the roller gap the laminate has a largely homogeneous structure in bonding zones 3, where almost all the fiber substance of nonwoven 7 and that of film 2 are fused together. The composite has a high degree of rigidity and dimensional stability in the area of bonding zones 3. It is water vapor impermeable in these zones.

Following the above-described laminating process, the composite material is subjected to stretching across the longitudinal direction of bonding zones 3. To do so, the composite material is passed through at least two consecutive stretching roller pairs, driven with increasing speeds, which causes the composite material passing between them to stretch. The forces applied to the composite material cause the stretching and plastic deformation mainly of film 5, resulting in the polymeric material being removed from the surface of the chalk particles contained in it, forming micropores. This results in improved water vapor permeability of the composite material, which favors its application in personal hygiene products.

Bonding zones 3 may also run diagonally to the longitudinal direction of the nonwoven or have a shape different from the embodiment described, for example, a punctiform shape or any other pattern. The only important thing is that the forces used during stretching should not be applied directly parallel to the longitudinal direction of bonding zones 3, since this may cause tearing within the bonding zones. If bonding zones 3 form a waffle-like pattern, the forces required for stretching must be applied perpendicularly to the surface of the composite material, for example, using an air or foam pad acting in the perpendicular direction, while the composite material as such is mechanically supported along bonding zones 3 and protected against deformation in these zones. The areas between the support zones can also be supported by set back support surfaces in order to limit elongation in these zones to predefined values and prevent overstretching and damage.

On the other hand, within the scope of the present invention, an embodiment is preferred where the forces required for stretching are applied essentially parallel to the longitudinal direction of the composite material. Such a procedure is much easier to carry out in industrial production. In the embodiment illustrated in FIG. 2, bonding zones 3 have the same degree of compactness in all subareas. They are uninterrupted and extend over the entire width of the composite material. The bonding zones may run across the longitudinal direction of the composite material, but also parallel to it or at some angle 8. Continuous, wave-shaped line sets or lines with any other shape can be used. It is important, however, that stretching should not be performed between two points of the composite material directly connected by a continuous straight-line bonding zone.

Figure 3:
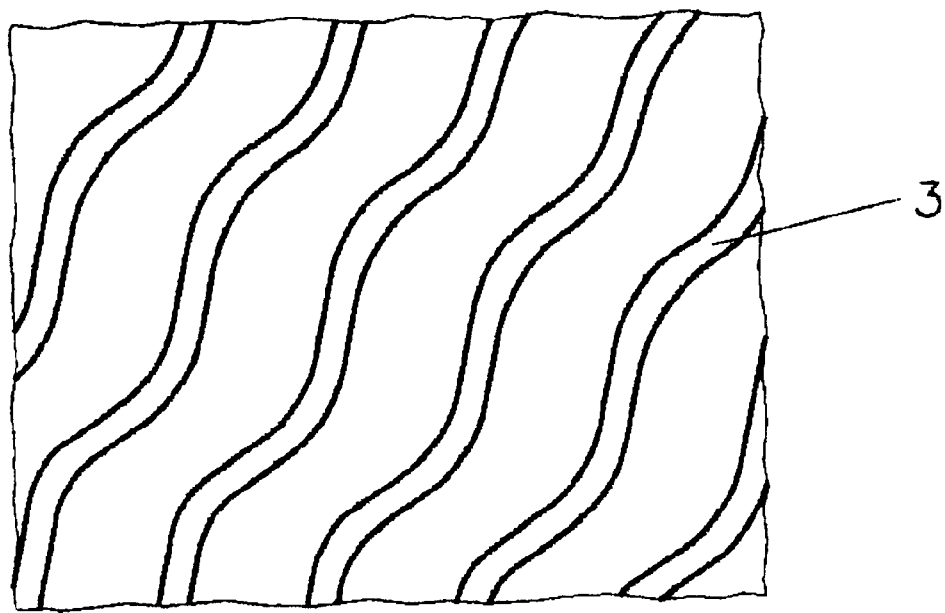
FIG. 3 shows a top view of a composite material similar to that of FIG. 2 with the bonding zones configured as wavy lines parallel to one another.
Figure 4:
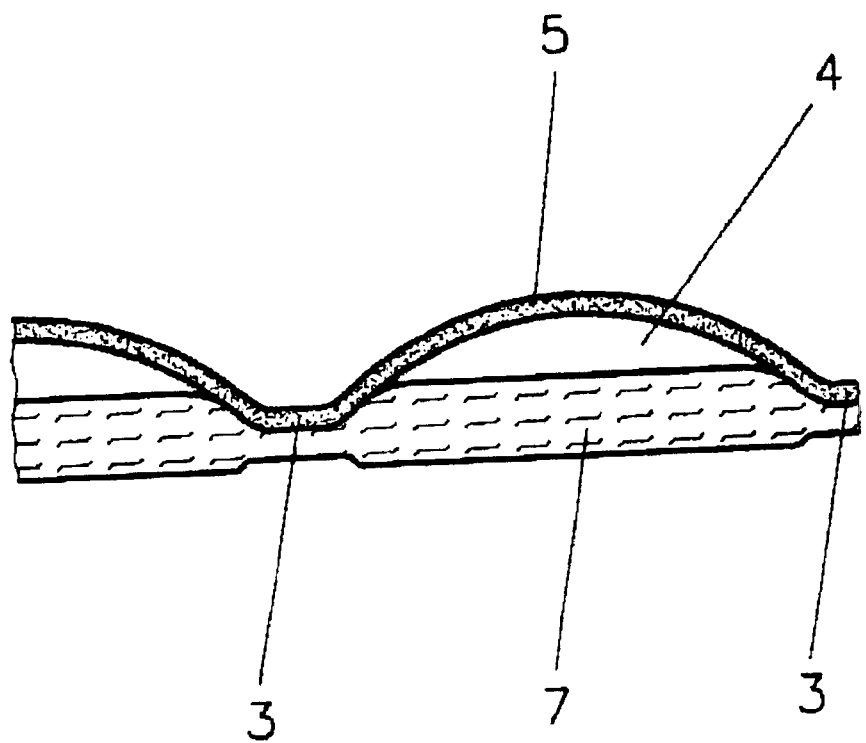
FIG. 4 shows a cross section through a composite material with the stress removed after stretching.

FIG. 3 shows a top view of a composite material, where the parallel bonding zones have a wave-like shape with an inclination of approximately 45° with respect to the longitudinal direction of the composite material. The elastic recovery after stretching of the nonwoven component 1 is greater than that of the film. This is indicated in FIG. 4. After the stress is removed, nonwoven 7 contracts with a reduction in size in the unbonded areas i.e., in the areas between bonding zones 3. The previously stretched, chalk-filled film 5 has a microporous structure due to stretching as before, but, compared to nonwoven 1, has no similar recovery. Therefore tunnel-shaped channels 4 are formed in the areas between bonding zones 3 of film 5 and nonwoven 7. The softness, drapability and formability of the composite material are thus considerably improved.

The invention is further explained below with reference to examples.

EXAMPLE 1

A nonwoven made of continuous polypropylene filaments using known spunbonded nonwoven technology is produced and placed on a perforated belt having a gsm of 60 g/m². The individual filaments forming the nonwoven are drawn using directional air currents to a minimum degree technically required for depositing the fibers.- The individual filaments of the largely undrawn polypropylene spunbonded nonwoven have a titre of 4.5 dtex. The individual filaments are deposited so that an average longitudinal/transversal orientation is 3/2.

A film of linear low density polyethylene (LLDPE) with uniformly distributed mineral filler particles in it is directly extruded on the still undrawn spunbonded nonwoven, using a wide-slot nozzle. The filler is chalk powder with an average particle size of 1 micron. It is contained in the melt in a proportion of 50 wt. and distributed uniformly in it. The gsm of the film thus formed and deposited on the nonwoven is 75 g/m².

The film with the mineral filler and the nonwoven are then bonded together in a pattern using calendering between a structured and a smooth steel roller. The side carrying the film is engaged with the structured roller, and the largely undrawn spunbonded unwoven side with the smooth roller. The temperature of the smooth roller is 145° C. and that of the structured roller is 125° C.

The surface of the structured roller has alternating elevations and depressions parallel to one another. The elevations are straight-line webs extending over the entire width of the roller as transversal beams. The webs have a height of 1.80 mm and a width of 3.20 mm. Their end faces occupy 25% of the roller surface and thus 25% of the theoretically available bonding area. The edges of the webs are slightly rounded in order to avoid cutting effects that might damage the material.

After calendering at a line pressure of 70 N/mm and a rotation speed of 80 m/min, the mineral-filled film layer having a gsm of 75 g/m² is intimately bonded to the continuous filament nonwoven in the areas of the webs' zones of action. Optical measurements of the bonding zones have not resulted in the theoretically expected value of 25%, but in 21.8% of the surface.

The coating compound cannot be separated from the spunbonded nonwoven at the bonding zones without destroying the material. Within the remaining 78.2% of the surface, separation is possible at the boundary surface between the coating compound and the nonwoven, but due to the small spacing of the bonding zones (10 mm), it cannot be measured quantitatively, since it cannot be clamped.

Subsequently the composite material with a gsm of 135 g/m² is stretched in the longitudinal direction at a temperature of 67° C. by a known method using a roller stretching mechanism. At the end of the stretching procedure, a width shrinkage of 9% results referred to the width prior to stretching, and an elongation of 185%, i.e., an increase in surface area of (2.85×0.91−1)×100=159.35%. The gsm of the drawn product is reduced from 135 to 52.05 g/m².

Water vapor permeability (WVP) was measured before and after stretching according to DIN 53 122, Klima B, i.e., at 38° C. and 90% relative humidity over calcium chloride as the desiccant.

| WVP prior to stretching | 5 g/m² 24 h |
|---|---|
| MVP after stretching | 1080 g/m² 24 h |

Since water-tightness measured according to DIN 53 886 was higher than 150 mbar, the stretched product was tested for pinholes. For this purpose, the specimen measuring 15×15 cm was placed with the coated side up on a somewhat-larger piece of four-layer blotting paper and red-dyed isopropanol was pipetted onto a total of 20 points. At no point did the red solution reach the blotting paper. The product is thus considered free of pinholes.

The fiber diameter of the stretched material was measured and converted to dtex. It was determined that the diameter surprisingly fluctuated between 1.3 and 2.5 dtex with an arithmetic mean of 1.7 dtex.

EXAMPLE 2

A chalk-filled melt compound with a gsm of 78 g/m² was extruded on the largely unstretched polypropylene spunbonded nonwoven with a gsm of 60 g/m² manufactured as in Example 1.

The extrusion compound is composed of 43 wt. % linear low-density polyethylene (LLDPE), 7 wt. % of a hydrocarbon-based adhesion enhancer with a softening point of 94° C. and 50% chalk with an average particle size of 1 micron.

The coating layer was bonded to the nonwoven using the roller pair described in Example 1. The temperature of the smooth roller was again 145° and that of the structured roller 93° C.

Then the laminate weighing 138 g/m² was stretched longitudinally by the known method using a roller stretching mechanism at a temperature of 62° C. At the end of the drawing process, a width shrinkage of 12% (calculated on the width prior to drawing) and an elongation of 235%, calculated on the original length, was obtained, resulting in an overall increase in surface area of (3.35×0.88−1)×100= 194.8%. The gsm of the stretched product was thus reduced by stretching from 138 to 46.8 g/m².

Water vapor permeability (WVP) was measured before and after stretching according to DIN 53 122, Klima B, i.e., at 38° C. and 90% relative humidity over calcium chloride as the desiccant.

| WVP prior to stretching | 12 g/m² 24 h |
|---|---|
| MVP after stretching | 1567 g/m² 24 h |

As in Example 1, no pinholes were detected.

The average fiber titre was 1.5 dtex with a variability of 1.2 to 2.4.

EXAMPLE 3

55 g/m² continuous filament with a titre of 4.80 dtex made of elastomeric metallocen-catalyzed LLDPE was deposited on a belt using directional air streams to form a planar structure by the method described in Example 1. From the series of these elastomeric LLDPEs, those types with the highest specific density of 0. 93 g/cm² and therefore the lowest elongation were selected.

The chalk-filled melt from Example 1 was extruded onto the flat structure made of partially elastomeric continuous filaments. The web-shaped bonding zones of both layers were produced in the gap of the calender rollers as in the method described in Example 1. The temperature of the smooth roller was again 125° C. and that of the structured roller 109° C. In contrast with Example 1, the web-shaped elevations were configured to provide beam-type bonding zones forming a 30° angle with the transversal direction, or a 60° angle with the machine direction and running parallel to one another.

Then the structure obtained was stretched first in the longitudinal direction at a temperature of 55° C. to 2.05 times the original length with a width shrinkage of 25%. Then it was stretched in the transversal direction to 1.30 times the original width prior to longitudinal stretching. This corresponds to an overall increase in surface area to 2.66 times the original (or an increase by 1.66 times).

After removing the stress, the product relaxed to 2.24 times the surface area calculated on the area prior to stretching. This corresponds to a reduction in surface area of 16% calculated on the surface area under stress after stretching. The elastic nonwoven substrate 7 had a smooth bottom side after relaxation and the microporous coating had convex elevations separated from nonwoven 7 by tunnel-shaped spaces 4 between the bonding points. Even after prior soaking of nonwoven 7, the top side of film 5 was warm and dry. The pattern obtained in Example 3 is also softer and more drapable than those of the two Examples 1 and 2.

After stretching and relaxation no pinholes were detected.

Water vapor permeability according to DIN 53 122, Klima B was determined to be 1210 g/m²24h.

What is claimed is:

1. A composite material including a laminate (1) made of a film (5) made of polymeric material bonded to a nonwoven (7), wherein the nonwoven (7) and the film (5) are bonded together at discrete bonding zones (3) and the laminate (1) is stretched in at least one direction after it has been formed, wherein the bonding zones are arranged along parallel lines running essentially transversely to the direction of stretching, and wherein the film (5) has uniformly distributed microparticles to favor the formation of micropores.

2. A composite material according to claim 1, wherein the laminate (1) is stretched in the longitudinal and transverse directions.

3. A composite material according to claim 1, wherein the laminate (1) is stretched in the longitudinal direction by at least 30% more than in the transverse direction.

4. A composite material according to claim 1, wherein the laminate (1) is stretched to a degree such that water vapor permeability is at least 800 g/m²24 h, measured according to DIN 53 122, Klima B.

5. A composite material according to claim 1, wherein the laminate (1) is formed without using a secondary adhesive by temporarily melting at least one of the layers (5,7) at discrete bonding zones (3).

6. A composite material according to claim 5, wherein the bonding zones (3) are configured in straight lines.

7. A composite material according to claim 1, wherein the layers (5,7) are bonded in the bonding zones (3) through their entire thickness.

8. A composite material according to claim 1, wherein the nonwoven (7) in the laminate (1) is composed, at least in part, of continuous fibers.

9. A composite material according to claim 1, wherein the nonwoven (7) in the laminate (1) is composed, at least in part, of staple fibers.

10. A composite material according to claim 8, wherein the fibers in the nonwoven (7) are essentially unstretched.

11. A composite material according to claim 8, wherein the fibers in the nonwoven (7) have a crystallinity enhanced by annealing.

12. A composite material according to claim 1, wherein the nonwoven (7) in the laminate (1) is composed at least in part of melt-blown fibers.

13. A composite material according to claim 1, wherein the film (5) in the laminate (1) is made of polypropylene or polyethylene.

14. A composite material according to claim 1, wherein the film (5) and the nonwoven (7) extend essentially parallel to one another.

15. A composite material according to claim 1, wherein the film (5) is curled.

16. An article of personal hygiene including a laminate (1) according to claim 1 as backing material.

17. A packing material including a laminate (1) according to claim 1 as backing material.

18. A construction sheeting including a laminate (1) according to claim 1, as backing material.

19. A composite material according to claim 1, wherein the nonwoven (7) is curled.

* * * * *

UNITED STATES PATENT AND TRADEMARK OFFICE
CERTIFICATE OF CORRECTION

PATENT NO. : 6,403,505 B1
DATED : June 11, 2002
INVENTOR(S) : Groitzsch et al.

It is certified that error appears in the above-identified patent and that said Letters Patent is hereby corrected as shown below:

Column 4,
Line 50, after "component" change "1" to -- 7 --; and

Column 5,
Line 14, after "50 wt." insert -- % --.

Signed and Sealed this

Seventeenth Day of June, 2003

JAMES E. ROGAN
*Director of the United States Patent and Trademark Office*